Jan. 22, 1957   R. J. BROOKS   2,778,481
DRIVE MECHANISM FOR CONVEYOR SYSTEMS
Filed Nov. 8, 1951   2 Sheets-Sheet 1

INVENTOR
ROBERT JOHN BROOKS
By:
AGENTS

INVENTOR
ROBERT JOHN BROOKS
By: Valentine, Lake & Co.
AGENTS

United States Patent Office 2,778,481
Patented Jan. 22, 1957

2,778,481
DRIVE MECHANISM FOR CONVEYOR SYSTEMS

Robert John Brooks, Hitchin, England, assignor to Geo. W. King Limited, Hitchin, England, a British company Application November 8, 1951, Serial No. 255,405

Claims priority, application Great Britain November 9, 1950

3 Claims. (Cl. 198—203)

This invention relates to drive mechanisms for conveyor systems and more particularly to such mechanisms of the kind which include an endless driving chain to which a drive is imparted, said driving chain being disposed in proximity to an endless conveyor chain so that driving dogs or projections carried thereby will engage said latter chain and impart a drive thereto.

It is the chief object of the invention to provide an improved driving chain assembly for use in mechanisms of the kind indicated above.

According to the invention in a driving chain of the kind referred to a plurality of abutment members each including a driving dog or abutment is incorporated in the chain each of said members being hingedly connected at one point to said chain and guided or supported at a point removed from such hinge connection by a bush, pin or the like also associated with said chain.

In further accordance with the invention in a driving chain for use in mechanisms of the kind referred to and comprising a succession of flat links hingedly interconnected by means of connecting bushes or the like, abutment members are incorporated at spaced points along the chain each of said members being connected at or adjacent one end to the chain for hinge movement about the axis of one of the connecting bushes or the like and being guided or supported at a point remote from such hinge connection by a connecting bush or pin associated with an adjacent link, said guiding or supporting bush or pin being adapted to engage a slot or slots in said member which is so formed that when in position in or on the chain a portion thereof will project outwardly from said chain to constitute an actual driving dog or abutment.

In order that the said invention may be clearly understood and readily carried into effect the same will now be more fully described with reference to the accompanying drawings in which.

Figure 1:
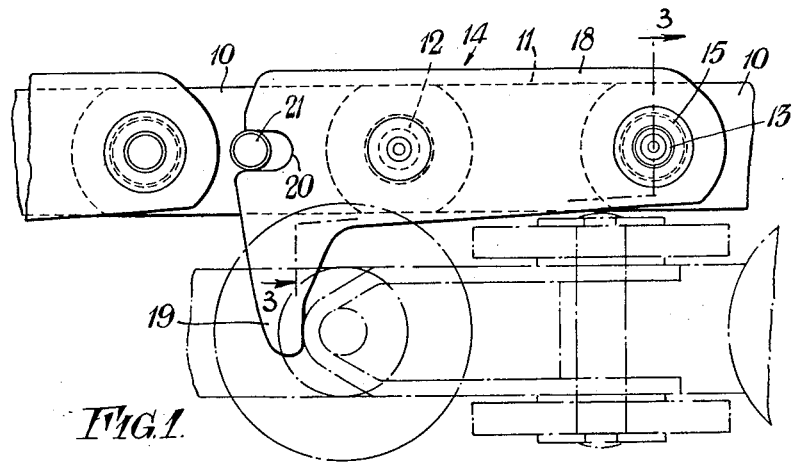
Figure 1 shows in side elevation a portion of a drive chain incorporating a driving dog or abutment member.
Figure 2:
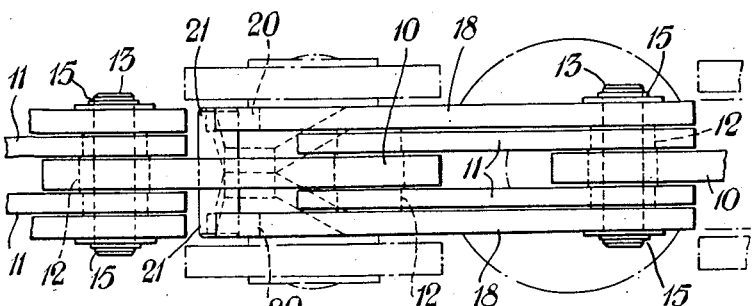
Figure 2 is a plan view of the portion of the chain shown in Figure 1.

Referring now to the drawings it will be seen that the endless driving chain, only a portion of which is illustrated, is made up of a plurality of flat links which are hingedly inter-connected in such a manner as to provide a succession of so called inner and outer links. Each inner link 10 is in the form of a single flat strip like element which is provided with apertures at or adjacent the opposite ends thereof to accommodate the requisite connecting bushes or the like. Each outer link comprises a pair of flat strip like elements 11, each having apertures at or adjacent the opposite ends thereof to accommodate the requisite connecting bushes or the like.

Figure 3:
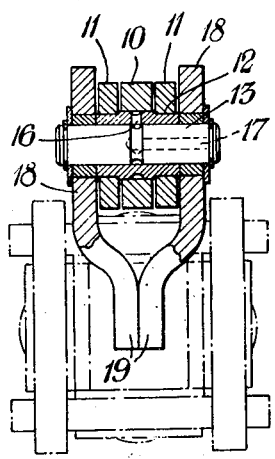
Figure 3 is a part sectional end elevational view, the section being taken on line 3—3 of Figure 1.

The construction is such that each inner link 10 will be connected to the elements 11 of each adjoining outer link by means of a bush 12 which is so dimensioned that when in position the ends thereof will lie flush or substantially flush with the outer faces of the two outer link elements. Each alternate connecting bush 12 is adapted to receive a pin 13 which will serve pivotally to connect a driving dog or like abutment member, designated generally by 14, to the chain. As will be apparent from the drawings each pin 13 will, when in position, project outwardly beyond the outer faces of the two outer link elements, i. e. will project outwardly from opposite sides of the chain and will thus provide a convenient mounting and connecting means for the member 14. When the member 14 is in place and the pin 13 is inserted, it (the pin) may be locked in position against axial displacement by means of retaining clips such as are indicated at 15. The connecting bushes 12 and the pins 13 are conveniently provided with suitable oil ducts or passages as indicated at 16 and 17 (Figure 3) in order to allow for lubrication of the link connections.

In the embodiment illustrated each member 14 comprises two strip like elements 18 each having a projecting portion or nose 19 at one end thereof. The projecting portions or noses are of similar shape and the construction is such that when the two strip like elements 18 are arranged back to back with the projecting portions or noses in register and flush one against the other said elements will be disposed in spaced parallel relationship. On assembly of each abutment member the two projecting portions or noses 19 are welded or otherwise secured together to form the actual driving dog or abutment, the two strip like elements 18 being so disposed that they will embrace the outer link of the chain and will lie parallel to the outer faces of the elements 11 forming such outer link, while the driving dog or abutment will lie on the centre line of the chain and project outwardly from the latter.

As indicated above an abutment member 14 is pivotally connected to the chain by means of a pin, such as 13, the pin passing through suitable apertures in the strip like elements 18 at that end thereof remote from the nose or projection. Having regard to the direction of travel of the chain the arrangement is such that the abutment members 14 will be pivoted at their forward ends the driving dogs thus being located at the rearward ends. In order to maintain each driving dog or abutment in the desired position relatively to the chain the strip like elements 18 are each formed at their rear edges with an open ended slot 20 the two slots being aligned and adapted to engage a pin 21 carried by the immediately succeeding inner link, the axis of the pin 21 being parallel to the axes of the pin 13 serving to inter-connect the abutment member to the chain and being disposed in the same plane.

When a driving chain, made up in the manner above described, is disposed in driving relation to a conveyor chain as indicated in Figure 1 (the conveyor chain being shown in dotted lines) suitable guide means will be disposed above said driving chain in order to take the reaction to which the driving dogs or abutment members are subjected when driving.

It is obvious that the mode of construction of the abutment members may be varied and they may be cast or otherwise suitably formed as integral or one piece units each comprising a centrally disposed depending lug or projection at or adjacent one end thereof and two parallel wing or plate like portions adapted to embrace any outer link of the chain so as to be capable of mounting thereon in such a manner that said member may be pivotally or hingedly connected to the chain at one end and guided at the other end by a pin in the next adjoining link of said chain.

Figure 4:
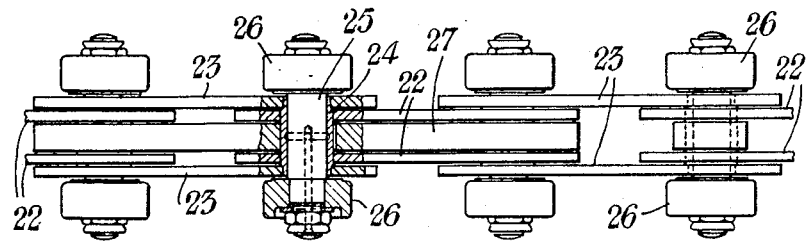
Figure 4 shows in plan a portion of a modified form of driving chain incorporating a modified driving dog or abutment member.
Figure 5:
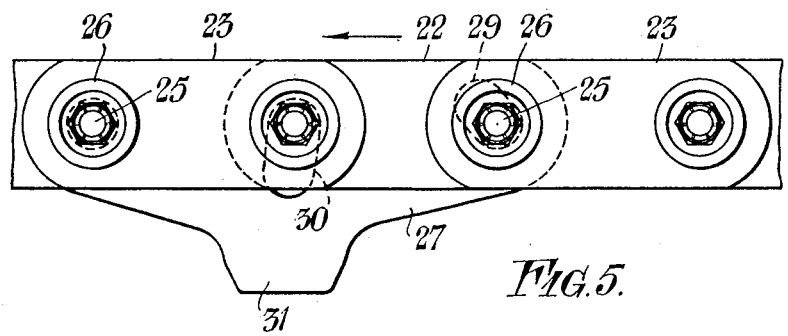
Figure 5 is a side elevational view of the chain shown in Figure 4.
Figure 6:
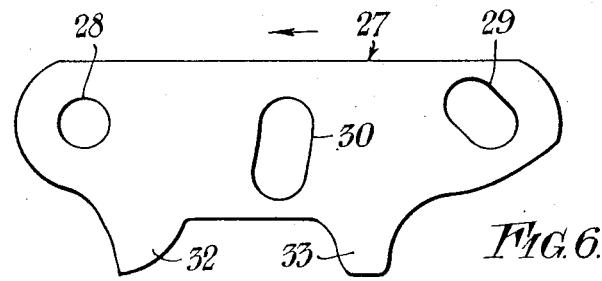
Figure 6 shows yet a further modified form of driving dog or abutment member for application to a chain of the type shown in Figures 4 and 5.

Instead of any of the constructions indicated above it may be desirable to provide an arrangement such as is indicated in Figures 4–6. Referring now particularly to those figures it will be seen that the chain therein illustrated is made up of successive pairs of inner and outer links 22 and 23 respectively, such links being interconnected by bushes such as 24 (Figure 4) each of which is adapted to accommodate a spindle 25 on which a pair of rollers 26 are mounted. Interposed between two successive pairs of inner links 22 is a driving dog or abutment member 27 which latter is formed at its forward end, having regard to the intended direction of travel of the chain which is indicated by the arrows in Figures 5 and 6, with an aperture 28 adapted to allow passage of a connecting bush 24 while at its rearward end said member is formed with an arcuate slot 29 adapted also to allow passage of a second connecting bush 24. The member 27 is also formed centrally with a further slot 30, adapted to accommodate a third connecting bush located intermediate the other two. The slots 29 and 30 serve to guide and to support the driving dog or abutment member 27 and also to allow for appropriate hinge movement between the chain links when said chain, for example, negotiates its sprockets or guides. In the embodiment shown in Figure 5 the member 27 is formed with a single lug or projection 31 adapted to constitute a driving dog or abutment whereas in Figure 6 said member incorporates two lugs or projections 32 and 33, the projection 32 being adapted to constitute the actual driving dog or abutment while the projection 33 constitutes an over-drive dog. When members 27, such as that indicated in Figure 6, are incorporated in the driving chain and the latter is disposed in driving relation to a conveyor chain the two lugs or projections 32 and 33 will project into or engage in the same link of said conveyor chain being located between two adjacent connecting pins or the like, thus in the event of the driving chain being stopped for any reason, relative motion between the two chains will be prevented and possibility of jamming thereby avoided. Also, in the event of the conveyor chain being hauled through the drive by a preceding drive jamming of the chains will be avoided.

By mounting the abutment members on the driving chain in the manner indicated in either Figures 1–3 or 4–6 said chain may be so arranged in relation to the conveyor chain that the angle of approach of the two chains will be relatively small. As indicated above the purpose of the slots 20 (Figures 1–3) and 29 (Figures 4–6) is to guide the respective abutment members particularly when the chain negotiates its sprockets and guides but it must be pointed out that the disposition of the slot 29 as compared with the slot 20 will have the effect of further reducing the approach angle of the chains.

By virtue of the invention it is possible to provide a more compact drive unit which will allow of direct entrance and exit of the dogs or driving abutments into or from the conveyor chain.

I claim:

1. A driving chain comprising a succession of inner and outer links, each of said links consisting of a pair of link elements disposed in parallel relationship with the outer end portions of the elements of said pair of links overlapping the end portions of the preceding and succeeding inner links, the inner end portions of said pair of links overlapping each other, connecting bushes extending through registering apertures in the overlapping portions of said links, thereby hingedly to interconnect the same and a plurality of flat strip like members disposed on the centre line of the chain at spaced points therealong, the opposite end portions of each of said members being sandwiched between the elements of successive inner links, one end portion of said member being pivotally mounted on the connecting bush extending through the outer elements of the adjacent inner link, the other end portion of said member being arcuately slotted and receiving the connecting bush extending through the outer elements of the next inner link in succession thereby to allow hinge movements of said links while the relative disposition of the successive links controls the position of said member with respect to the links, said members also each being formed with at least one projection which is adapted to extend outwardly from the chain to form a driving abutment each of said members being provided with a central slot, each of the slots extending from its associated bush respectively to opposite sides of the chain.

2. A driving chain comprising a succession of inner and outer links, each of said links consisting of a pair of link elements disposed in parallel relationship with the end portions of the elements of each outer link overlapping the end portions of the preceding and succeeding inner links, connecting bushes extending through registering apertures in the overlapping portions of said links, thereby hingedly to interconnect the same and a plurality of flat strip like members disposed on the centre line of the chain at spaced points therealong, each of such members being hingedly connected adjacent one end to the chain by one of said connecting bushes extending through one of said inner links and having a first slot at a point removed from such hinge connection receiving another of said connecting bushes associated with another of said inner links so that the relative disposition of said one inner link and said other inner links controls the position of the related member with respect to the links, each of said members also being formed with at least one projection adapted to extend outwardly from the chain to form a driving abutment, each of said members being provided with a second slot for engaging an intermediate bush, said slots extending substantially from the center of the chain respectively towards the top and bottom thereof.

3. A driving chain comprising a succession of inner and outer links, each of said links consisting of a pair of link elements disposed in parallel relationship with the end portions of the elements of each outer link overlapping the end portions of the preceding and succeeding inner links, connecting bushes extending through registering apertures in the overlapping portions of said links, thereby hingedly to interconnect the same and a plurality of flat strip like members which are disposed on the centre line of the chain at spaced points therealong and with the opposite end portions of each sandwiched between elements of successive pairs of inner links, said members each being formed with an aperture adjacent one end, a slot adjacent the other end and a further slot at a point intermediate its ends which aperture and slots accommodate the connecting bushes serving to interconnect three adjoining chain links and by means of which said member is attached to the chain and positioned with respect to the latter and said member also being formed with at least one projection extending outwardly from the chain and adapted to form a driving abutment, the slots extending in opposite directions from the center of the chain.

References Cited in the file of this patent

UNITED STATES PATENTS

| | | |
|---|---|---|
| 802,047 | Krell | Oct. 17, 1905 |
| 1,278,543 | Wilson | Sept. 10, 1918 |
| 1,279,579 | Perkins | Sept. 24, 1918 |
| 1,960,719 | Stibbs | May 29, 1934 |
| 2,309,587 | Hassler | Jan. 26, 1943 |
| 2,362,848 | Pearson | Nov. 14, 1944 |